(No Model.)  2 Sheets—Sheet 1.

M. W. HASSAN.
ELECTRIC STORE SERVICE APPARATUS.

No. 470,428. Patented Mar. 8, 1892.

(No Model.) 2 Sheets—Sheet 2.
M. W. HASSAN.
ELECTRIC STORE SERVICE APPARATUS.

No. 470,428. Patented Mar. 8, 1892.

Witnesses
O. N. Adams
Chauncey Perry

Inventor
Medbury W. Hassan,
By his Attorney
R. F. Osgood.

UNITED STATES PATENT OFFICE.

MIDBURY W. HASSAN, OF ROCHESTER, NEW YORK.

ELECTRIC STORE-SERVICE APPARATUS.

SPECIFICATION forming part of Letters Patent No. 470,428, dated March 8, 1892.

Application filed February 2, 1891. Serial No. 380,100. (No model.)

*To all whom it may concern:*

Be it known that I, MIDBURY W. HASSAN, of Rochester, in the county of Monroe and State of New York, have invented a certain new and useful Improvement in Electrical Conveyers; and I do hereby declare that the following is a full, clear, and exact description of the same, reference being had to the drawings accompanying this specification.

My improvement relates to store-service apparatus; and it consists in electric appliances constructed, arranged, and operating as hereinafter more fully described and definitely claimed.

Figure 1:
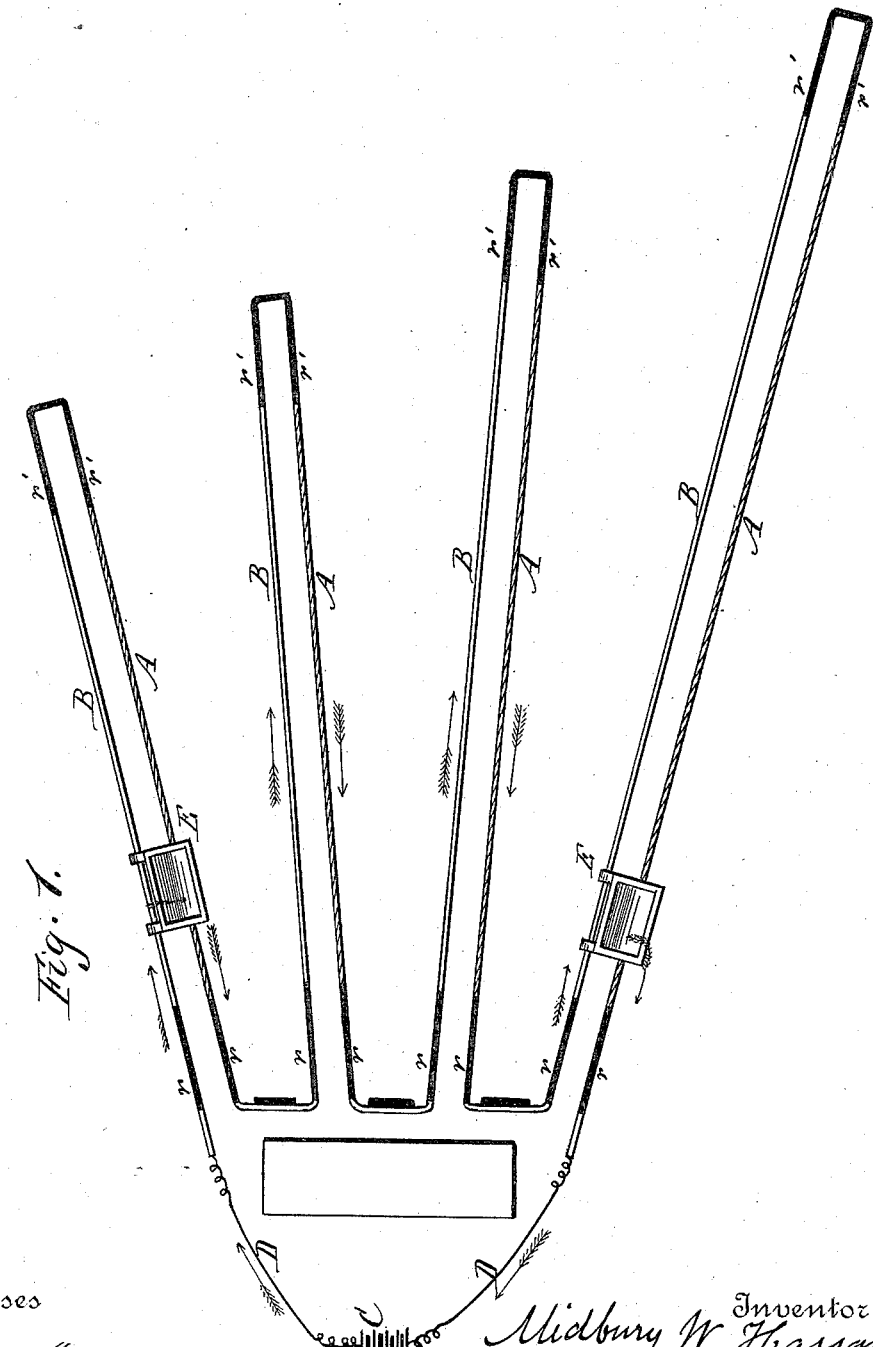
Figure 2:
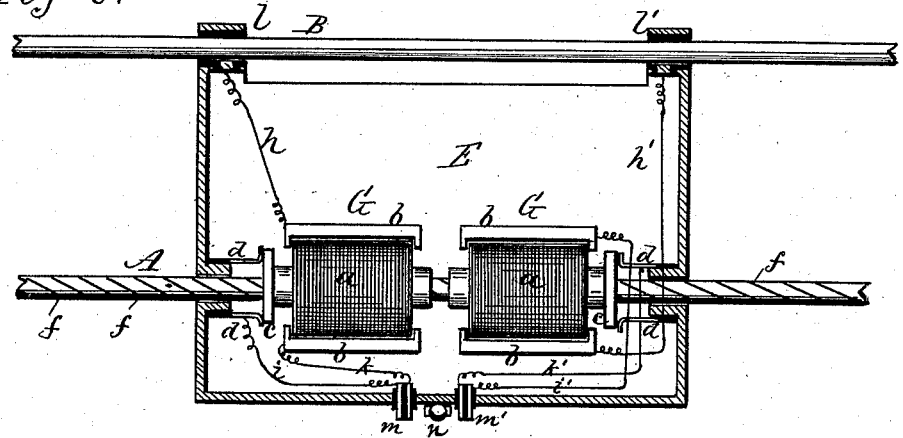
Figure 3:
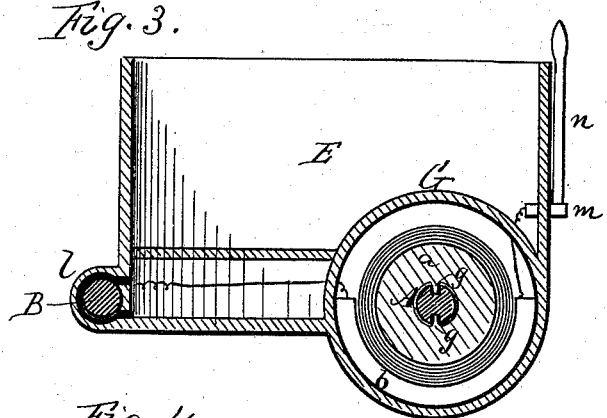
Figure 4:
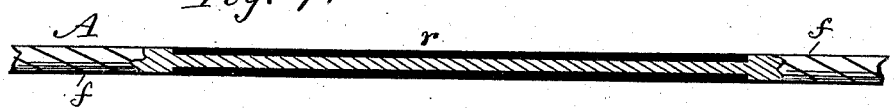
Figure 5:
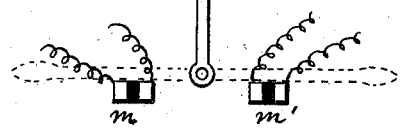

In the drawings, Figure 1 is a diagram showing a plan view of the apparatus. Fig. 2 is an enlarged plan view of a part of the circuit and a horizontal section of one of the carriers. Fig. 3 is a cross-section of the same. Fig. 4 is an enlarged longitudinal section of a portion of one of the wires, showing one of the insulators thereon for turning the current from the carrier at the end of its travel. Fig. 5 is a diagram showing an elevation of the switch.

In this invention there are as many loops in the circuit as there are salesmen's stations, and each loop consists of two wires, on which runs the carrier. At the opposite ends of each loop are insulated lengths on which the carrier runs to turn off the current. Each carrier is provided with two motors, which run the carrier in opposite directions, and the connections of the motors are attached to electrodes, between which rests a switch, by turning which the current is reversed.

The construction is as follows: A and B indicate the two wires of each loop, and there are as many of these pairs of wires as there are stations. For convenience of operation these several loops are all combined in one circuit, as shown in Fig. 1, and are fed by a battery C, having wires D D connecting with the operating-wires. The current passing through the whole circuit runs in opposite direction through each parallel pair of wires.

E E are the carriers, one to each pair of wires. They may be of any convenient size or form.

G G are two motors, attached to each carrier and running on the wire A. Each of these motors consists of an armature $a$, field-magnet $b$, commutator $c$, and brushes $d$ $d$. The wire A is cut with spiral grooves or threads $f f$, with which engage tongues $g g$, forming nuts at the ends of the armatures, by which means, when rotary motion is imparted to the armatures, the carrier will be propelled in one direction or the other. The two motors are provided with electrical connections $h$ $i$ $k$ and $h'$ $i'$ $k'$, the wires $h$ $h'$ connecting with the bearings $l$ $l'$ that run on wire B and the wires $i$ $k$ and $i'$ $k'$ connecting with electrodes $m$ $m'$ on the opposite side of the carrier. Each of these electrodes consists of two pieces separated by an insulator, the two separated wires connecting, respectively, with said pieces. Between these electrodes rests a switch $n'$, consisting of a metallic handle, which, when it stands upright, separates from both electrodes and breaks the circuit of both. When it is turned down on either side, as indicated by dotted lines, Fig. 5, it covers both pieces of the electrode on that side and closes the circuit of the same, the current being turned off from the other motor. When shifted again, the opposite motor receives motion and the first one stops. These motors revolve reversely, and by this means the carrier is run in opposite directions. The switch-handle stands outside the carrier, where it can be readily reached and operated by hand. It should be stated that the carrier-bearings $l$ $l'$, that run on wire B, are insulated from the body of the carrier to prevent the passage of the current through the frame of the car from side to side.

$r$ $r$ and $r$ $r'$ are insulators at the opposite ends of the wires A B, consisting of rubber or other tubes fitted on the wires, being of the same external diameter, but not cutting off the passage of the wires through the center. The length of these insulators is such as to receive the motors and the bearings $l$ $l'$ thereon at the end of the passage of the carrier, thus turning off the current automatically, demagnetizing the motors, and stopping the carrier. The insulators $r$ $r'$ on the wire A are cut with spiral threads or grooves, the same as the wire itself, to allow the carrier to run on and off the same. To start the carrier when it has stopped at either end, it is simply pushed by hand from the insulators onto the live wire. If desired, instead of using the carrier itself as a package-holder, a basket or other receptacle may be attached and serve as the holder.

Having described my invention, I do not claim, broadly, a spirally-grooved wire on which the armature of the motor runs, such as is shown in my pending application filed December 29, 1890, Serial No. 376,134. Neither do I claim an insulated side track on which the car runs from the main track, as shown in Patent No. 270,209, dated January 9, 1883.

What I claim as new, and desire to secure by Letters Patent, is—

1. The combination, with two parallel wires in an electric circuit, forming a track, and a carrier running thereon, of an insulator at one or both ends embedded in the wire without cutting off its continuity, said insulator serving to receive the carrier and cut off the circuit therefrom, as described.

2. The combination, with two parallel wires forming a circuit, one being spirally grooved, and with a carrier running thereon, of an insulator at the end of the wire embedded therein without cutting off its continuity and provided with spiral grooves corresponding with those of the grooved wire, as and for the purpose specified.

3. The combination of two parallel wires in an electric circuit, forming a track, one of said wires being spirally grooved or threaded, a carrier running on said wires, two independent motors attached to the carrier, running on the spirally-grooved or threaded wire and engaging therewith, electrical connections attached to said motors, by which they are operated, and a switch for alternately imparting motion to one motor and cutting it off from the other, whereby the carrier can be run in opposite directions, as herein shown and described.

In witness whereof I have hereunto signed my name in the presence of two subscribing witnesses.

MIDBURY W. HASSAN.

Witnesses:
R. F. OSGOOD,
CHAS. A. WIDENER.